United States Patent
Bowen et al.

(10) Patent No.: US 9,791,640 B2
(45) Date of Patent: Oct. 17, 2017

(54) INTERPOSER WITH SEPARABLE INTERFACE

(71) Applicant: TYCO ELECTRONICS CORPORATION, Berwyn, PA (US)

(72) Inventors: Terry Patrick Bowen, Dillsburg, PA (US); William A. Weeks, Ivyland, PA (US); James Toth, San Carlos, CA (US); Jibin Sun, Redwood City, CA (US); Sandeep Razdan, Millbrae, CA (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 15/069,512

(22) Filed: Mar. 14, 2016

(65) Prior Publication Data

US 2017/0261703 A1     Sep. 14, 2017

(51) Int. Cl.
*G02B 6/12* (2006.01)
*G02B 6/32* (2006.01)
*G02B 6/42* (2006.01)
*G02B 6/34* (2006.01)
*G02B 6/30* (2006.01)

(52) U.S. Cl.
CPC ....... *G02B 6/4206* (2013.01); *G02B 6/12004* (2013.01); *G02B 6/30* (2013.01); *G02B 6/32* (2013.01); *G02B 6/34* (2013.01); *G02B 6/423* (2013.01); *G02B 6/4214* (2013.01); *G02B 6/4228* (2013.01); *G02B 6/4231* (2013.01); *G02B 6/4274* (2013.01)

(58) Field of Classification Search
CPC .................................................. G02B 6/4231
See application file for complete search history.

(56) References Cited

U.S. PATENT DOCUMENTS

| | | | | |
|---|---|---|---|---|
| 5,259,054 A | * | 11/1993 | Benzoni et al. ..... | G02B 6/4202 385/76 |
| 6,477,303 B1 | * | 11/2002 | Witherspoon ........... | G02B 6/32 385/35 |
| 7,362,926 B2 | * | 4/2008 | Umezawa ............ | G02B 6/4204 385/14 |
| 7,853,105 B2 | * | 12/2010 | Budd et al. .............. | G02B 6/30 385/129 |

(Continued)

FOREIGN PATENT DOCUMENTS

JP        2003255166 A    *   9/2003    ......... G02B 6/12002

*Primary Examiner* — Michelle R Connelly

(57) ABSTRACT

An interposer for coupling an optical conduit to an optical component, said interposer comprising: (a) an optical component; (b) a first lens component having a first lens; (c) a second lens component having a second lens, said first and second lenses being configured to define an expanded-beam coupling therebetween; (d) at least one reflective surface optically coupled with said second lens; (e) a first optical path at least partially defined between said optical component and said first lens to accommodate a diverging light beam from said optical component to said first lens; (f) a second optical path at least partially defined between said second lens and said at least one reflective surface to accommodate a converging light beam from said second lens and said at least one reflective surface; and (g) a separable interface along said second optical path or at said expanded-beam coupling.

16 Claims, 2 Drawing Sheets

(56) References Cited

U.S. PATENT DOCUMENTS

| | | | | |
|---|---|---|---|---|
| 9,366,832 B2* | 6/2016 | Arao et al. | ................ | G02B 6/43 |
| 2003/0161573 A1* | 8/2003 | Ishida et al. | ........ | G02B 6/12002 |
| | | | | 385/14 |
| 2005/0281507 A1* | 12/2005 | Kropp | ....................... | G02B 6/30 |
| | | | | 385/31 |
| 2006/0239605 A1* | 10/2006 | Palen et al. | .......... | G02B 6/4206 |
| | | | | 385/14 |
| 2011/0064358 A1* | 3/2011 | Nishimura | ............ | G02B 6/4214 |
| | | | | 385/33 |
| 2013/0156366 A1* | 6/2013 | Raj et al. | ............. | G02B 6/1228 |
| | | | | 385/14 |
| 2013/0209026 A1* | 8/2013 | Doany et al. | ......... | G02B 6/4214 |
| | | | | 385/14 |
| 2013/0209038 A1* | 8/2013 | Pommer et al. | ........ | G02B 6/424 |
| | | | | 385/76 |
| 2014/0193124 A1* | 7/2014 | Bylander et al. | ..... | G02B 6/4214 |
| | | | | 385/93 |
| 2014/0199019 A1* | 7/2014 | Yabre | .................... | G02B 6/4206 |
| | | | | 385/14 |
| 2014/0203175 A1* | 7/2014 | Kobrinsky et al. | ..... | G02B 6/428 |
| | | | | 250/214.1 |
| 2014/0294342 A1* | 10/2014 | Offrein et al. | ........ | G02B 6/4214 |
| | | | | 385/14 |
| 2014/0314422 A1* | 10/2014 | Shao et al. | ............. | H04B 10/40 |
| | | | | 398/138 |
| 2015/0078711 A1* | 3/2015 | Ootorii | ................ | G02B 6/4268 |
| | | | | 385/88 |
| 2015/0145086 A1* | 5/2015 | Rokuhara et al. | ....... | H01S 5/005 |
| | | | | 257/432 |
| 2015/0293305 A1* | 10/2015 | Nakagawa et al. | ... | G02B 3/0006 |
| | | | | 29/428 |
| 2016/0209595 A1* | 7/2016 | Taira | ........................ | G02B 6/32 |

* cited by examiner

INTERPOSER WITH SEPARABLE INTERFACE

FIELD OF DISCLOSURE

The subject matter herein relates generally to fiber optical interposers, and, more particularly, to interposers having separable interfaces.

BACKGROUND

Fiber optic components are used in a wide variety of applications. The use of optical fibers as a medium for transmission of digital data (including voice, internet and IP video data) is becoming increasingly more common due to the high reliability and large bandwidth available with optical transmission systems. Fundamental to these systems are optical subassemblies for transmitting and/or receiving optical signals.

Optical subassemblies typically comprise an interposer. As used herein, an interposer functions as a substrate for optical, opto-electrical, and electrical components and provides interconnections to optically and/or electrically interconnect the optical/opto-electrical/electrical components. There is a need to provide an interposer with a separable interface to provide a disconnect between the electrical/optical components and the optical conduit(s) (e.g. fibers). The present invention fulfils this need among others.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In one embodiment, the interposer disclosed herein has a separable interface along an optical path which is characterized by an expanded beam. Because the disconnect is located along an optical path having an expanded beam, the interface itself is less susceptible to misalignment and debris. Specifically, an expanded beam tends to be less susceptible to misalignment because it is much larger, and, thus, any portion of the beam lost to misalignment tends to be a smaller portion of the overall expanded beam. Also, because the beam is expanded, the relative size of the debris to the beam is reduced, thereby, making the beam less susceptible to interference from the debris. Further, in one embodiment, the separable interface is located along an air gap in the optical path. Having a separable interface located at an air gap reduces problems with trapping dirt and other debris between optical components of the interface, which can degrade optical performance.

In one embodiment, the optical path(s) of the interposer are defined in a silicon-based material and/or a glass-based material such that differences in the thermal expansion coefficients of the different components, e.g., the lens components, are minimal. Such a feature is beneficial in that, as the interposer undergoes thermal cycling, the optical elements in the interposer will remain aligned as they tend to shrink and expand together. Conversely, conventional systems in which the optical path(s) are defined across polymeric-molded and silicon-based components suffer from significant optical degradation during temperature cycles due to disparate shrinking/expanding of the various optical elements. Additionally, Applicants recognize that silicon-based components are effectively transparent at longer wavelength applications, and, thus, as the operating wavelength of interposers increases, there is no barrier to using silicon-based components to define the optical paths.

Accordingly, one aspect of the present invention relates to an interposer having a separable interface along an optical path having an expanded beam. In one embodiment, the interposer comprises: (a) an optical component; (b) a first lens component having a first lens; (c) a second lens component having a second lens, said first and second lenses being configured to define an expanded-beam coupling therebetween; (d) at least one reflective surface optically coupled with said second lens; (e) a first optical path at least partially defined between said optical component and said first lens to accommodate a diverging light beam from said optical component to said first lens; (f) a second optical path at least partially defined between said second lens and said at least one reflective surface to accommodate a converging light beam from said second lens and said at least one reflective surface; and (g) a separable interface along said second optical path or at said expanded-beam coupling.

DETAILED DESCRIPTION

Figure 1:
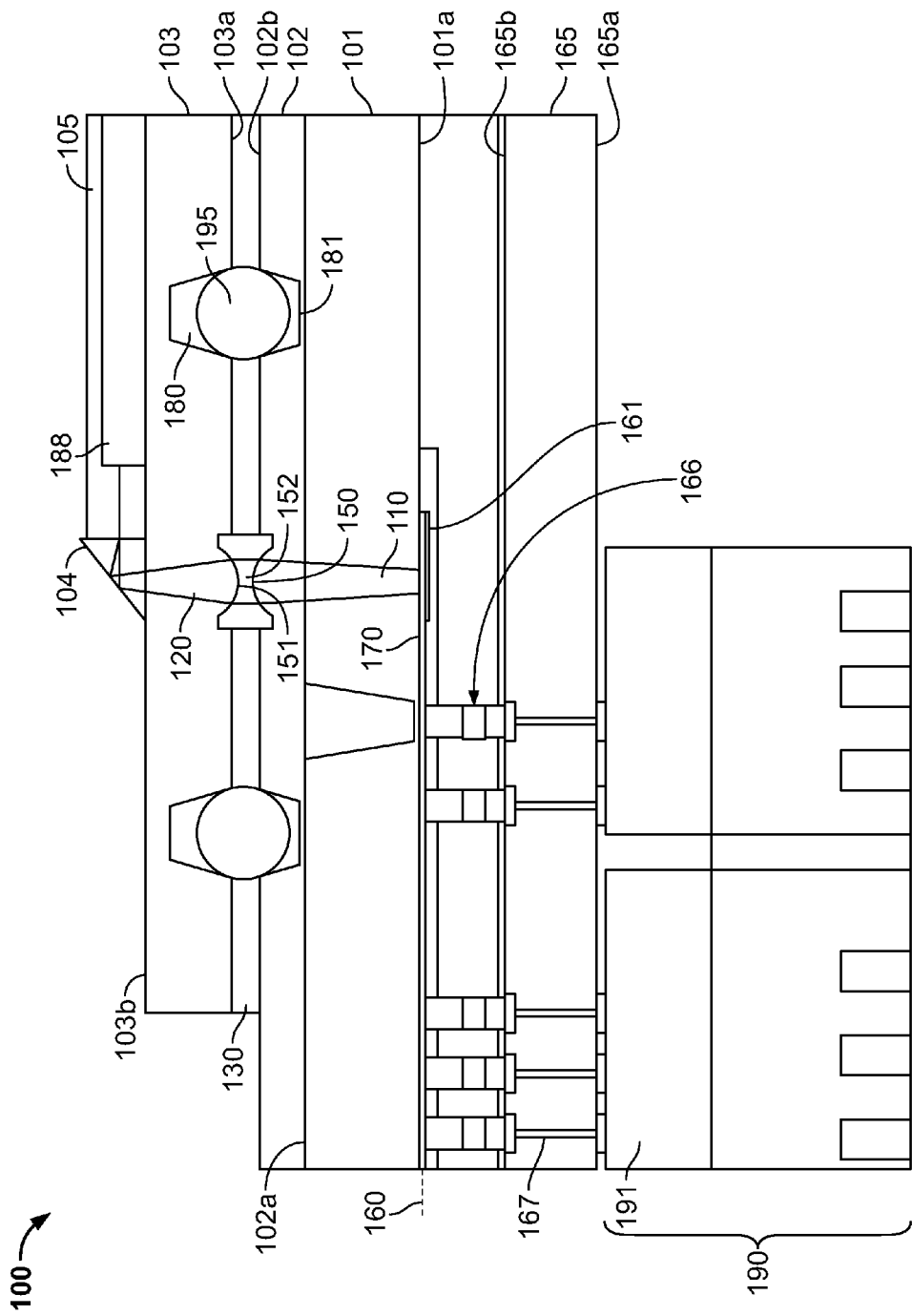
FIG. 1 shows one embodiment of the separable interposer of the present invention.
Figure 2:
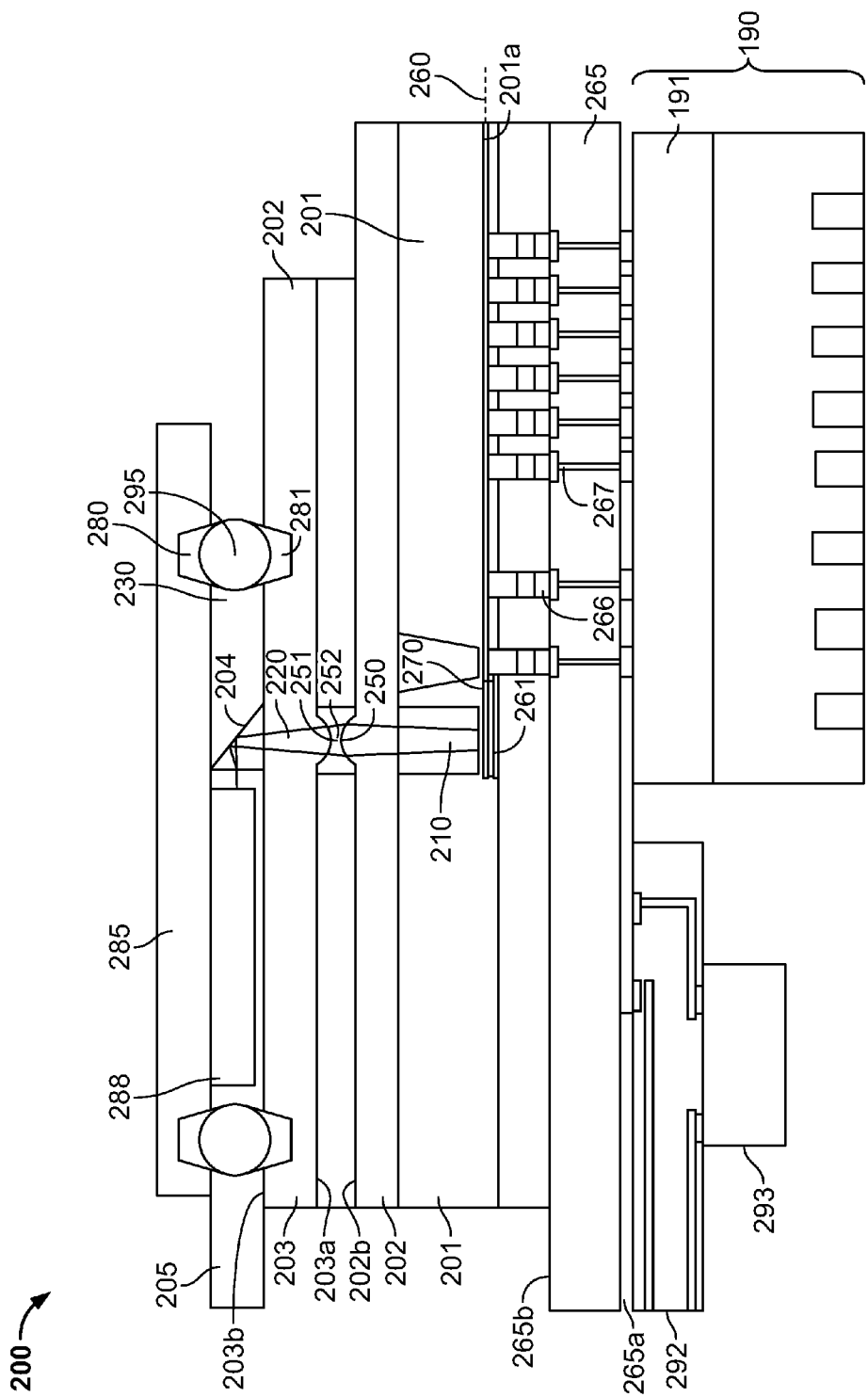
FIG. 2 shows another embodiment of the separable interposer of the present invention

Referring to FIGS. 1 and 2, two embodiments of interposer 100, 200 are shown, respectively. In these embodiments, the interposer 100, 200 couples an optical component 101, 201 to an optical conduit 105, 205. To this end, the optical component 101, 201 is optically coupled to a first lens component 102, 202 having a first lens 150, 250. The interposer also comprises a second lens component 103, 203, having at least a second lens 151, 251. The first and second lenses are configured to define an expanded-beam coupling therebetween. Optically coupled to the second lens component is at least one reflective surface 104, 204. A first optical path 110, 210 is at least partially defined between said optical component and said first lens to accommodate a diverging light beam from said optical component to said first lens. A second optical path 120, 220 is at least partially defined between the second lens 151, 251 and the at least one reflective surface 104, 204 to accommodate a converging light beam from said second lens and said at least one reflective surface. The interposer comprises a separable interface 130, 230 along said second optical path. The interposers 100, 200 are described in detail below. It should be understood that the embodiment(s) disclosed herein are merely illustrative of the invention and should not be construed as limiting the invention unless expressly indicated.

In one embodiment, the first and second optical paths are defined in a silicon-based material and/or a glass-based material such that the difference in the thermal expansion coefficients of the different components, e.g., the first and second lens components, is minimal. Such a feature is beneficial in that, as the interposer undergoes thermal cycling, and the optical elements in the first and second lens components will remain aligned as the first and second lens components tend to shrink and expand together. Conversely, conventional systems which define optical path(s) across polymeric-molded and silicon-based components could suffer from significant optical degradation during temperature cycles due to misalignment of the various optical elements caused the disparate shrinking/expanding of the components. Additionally, Applicants recognize that silicon-based components are effectively transparent at higher wavelength applications, and thus, as the wavelengths of interposers tend to increase, there is no barrier to using silicon-based components to define the optical paths.

The optical component 101, 201 may be any known or later-developed component that can be optically coupled to an optical conduit as described below. The optical device may be for example: (a) an optoelectronic device (OED), which is an electrical device that sources, detects and/or controls light (e.g. photonics processor, such as a complementary metal oxide semiconductor (CMOS) photonic processor, for receiving optical signals, processing the signals and transmitting responsive signals; electro-optical memory; electro-optical random-access memory (EO-RAM) or electro-optical dynamic random-access memory (EO-DRAM); and electro-optical logic chips for managing optical memory (EO-logic chips); lasers, such as vertical cavity surface emitting laser (VCSEL); double channel, planar buried heterostructure (DC-PBH), buried crescent (BC), distributed feedback (DFB), distributed bragg reflector (DBR); light-emitting diodes (LEDs), such as surface emitting LEDs (SLEDs), edge emitting LEDs (ELEDs), super luminescent diodes (SLDs); and photodiodes, such as P Intrinsic N (PIN) and avalanche photodiodes (APDs)); (b) a passive component, which does not convert optical energy to another form and which does not change state (e.g., fiber, lens, add/drop filters, arrayed waveguide gratings (AWGs), gradient-index (GRIN) lens, splitters/couplers, planar waveguides, or attenuators); or (c) a hybrid device which does not convert optical energy to another form but which changes state in response to a control signal (e.g., switches, modulators, attenuators, and tunable filters). It should also be understood that the optical device may be a single discrete device or it may be assembled or integrated as an array of devices. In the particular embodiment disclosed in FIG. 1, the optical component is a photonic integrated circuit (PIC) comprising a combination of sub-components which may include; laser optical source components, passive optical waveguides, optical modulators, optical wavelength division multiplexors, optical waveguide grating couplers, optical mode matching elements, optical wavelength de-multiplexors, optical polarization combiners/splitters/rotators, electrical/optical/thermal vias, and optical detectors. The PIC also comprises an electrical interconnection interface, an optical interconnection interface, and a thermal interconnection interface.

In one embodiment, the optical component comprises at least one optical waveguide 170, 270 within the optical component. Suitable waveguides include, for example, silicon-on-insulator (SOI) wire, rib waveguides, or even optical fiber. In one embodiment as shown in FIG. 1, silicon waveguides 170, 270 are formed on the bottom first surface 101a, 201a of the optical component 101 by photolithographic patterning. The center of the optical mode propagating in the waveguides 170, 270 defines the optical axis of the optical component.

Referring to FIGS. 1 and 2, in one embodiment, the optical component 101, 201 has at least one first optical axis 160, 260 along which the light propagates in the optical component. It should be understood that the optical component is not limited to a single first optical axis and may comprise a plurality of first optical axes.

Often, although not necessarily, the optical axis 160, 260 is generally perpendicular to the first optical path 110, 210. In such an embodiment, a reflective surface, grating or similar optical mode matching element 161, 261 known for changing the direction and/or mode diameter and/or convergence/divergence angles of the light beam may be used in the optical component, or a discrete component may be used to bend the light between the optical conduit and the optical component. In one embodiment, the mode matching element comprises a diffractive optical element (DOE) which is a thin phase element that operates by means of interference and diffraction to produce calculated distributions of light. DOEs are sometimes also referred to as gratings, holographic optical elements, and sub-wavelength diffraction gratings. The DOE is interfaced with a waveguide using known techniques such as an adiabatic taper waveguide transition. In one embodiment, the DOE has a refractive index close to or equal to that of the material of the waveguide 170, 270. By designing the amount of difference in refractive index between the waveguide material and that of the DOE material, the coupling efficiency of the waveguide and DOE can be optimized. For example, if the waveguide is silicon (Si), Applicants realized that a DOE comprising silicon nitride ($Si_3N_4$) has an improved coupling efficiency over a DOE formed directly in silicon. Other embodiments will be known or obvious to those of skill in the art in light of this disclosure.

In the embodiment of FIGS. 1 and 2, the waveguide 170, 270 is integral to the optical component 101, 201. It should be understood, however, that the waveguide may be discrete and freestanding from the optical component. Alternatively, the waveguide and DOE may be disposed on a second substrate (not shown). The second substrate may be for example, silicon, PCB, flex material, glass, or polyimide. In such an embodiment, the pads/pillars for alignment and thermal/electrical interconnection with the interposer as described below in connection with the substrate may be used. In this respect, it should be noted that the invention may be practiced without a fully integrated optical component.

The first and second lens components serve to couple light between the first and second optical paths. Specifically, the first lens component receives light, which is usually diverging, and through the first lens redirects the beam to the second lens and the second optical path. For example, between the first and second lenses, the beam may be collimated as shown in FIGS. 1 and 2. Therefore, when the beam is redirected by the first lens 150, 250 to the second lens 151, 251, the beam is communicated from the first optical path to the second optical path. It should be understood that the beam may travel in the opposite direction in certain embodiments of the interposer; and thus the first lens 150, 250 and the second lens 151, 251 would communicate the beam from the second optical path to the first optical path in such a configuration. If the beam is collimated by the first lens, then a second lens is used in the second lens component to focus the light as shown in FIGS. 1 and 2.

In one embodiment, the first and second lens components are silicon and/or glass along with the other components defining the first and second optical paths, thus minimizing differences in thermal expansion coefficients among the various components defining the optical paths as discussed above.

Although the first lens component, the second lens component and the optical component are discrete in the embodiments of FIGS. 1 and 2, other embodiments are possible. For example, the first and second lens components may be combined in a unitary structure or they may be integrally formed. Likewise, the first lens component and the optical component may be combined in a unitary structure or they may be integrally formed.

The lenses 150, 151, and 250, 251 may be integral to the respective lens components or discrete. In one embodiment, the lenses are integral with the respective lens components. For example, referring to FIGS. 1 and 2, the first lens 150, 250 is defined on the top surface 102b, 202b of the first lens component 102, 202, and the second lens 151, 251 is defined on the bottom surface 103a, 203a of the second lens component 103, 203. Alternatively, the first lens could be defined on the bottom surface 102a, 202a of the first lens component 102, 202, and/or the second lens could be defined on the top surface 103b, 203b of the second lens component 103, 203. Having the lenses integrally formed in the silicon lens components minimizes differences in the thermal expansion coefficients among the different components defining the first and second optical paths. Nevertheless, it should be understood that other embodiments exist in which the lens is discrete from the lens components. For example, the first and second lens may be discrete ball lenses of an optically clear material, such as glass or quartz, which are held in place by the first and second lens components.

The reflective surface 104, 204 serves to bend the light between the second optical path and the optical conduit 105, 205. Suitable reflective surfaces are well known and include, for example, reflective and refractive light-bending surfaces. The reflective surface may be a discrete component such as a mirror element that is attached to or disposed on the surface of the second lens component or it may be integrally formed in a component of the interposer. For example, in an alternative embodiment (not shown), the reflective surface is etched in the top surface of the second lens component along with grooves such that the reflective surface optically couples an optical conduit in the groove with the second optical path. Still other embodiments will be known or obvious to one of skill in the art in light of this disclosure.

In the embodiment of FIGS. 1 and 2, the reflective surface 104 is disposed on the top surface 103b of the second lens component 103. In FIG. 1, the reflective surface is connected to the second lens component and aligned with, grooves, grippers, holders or compliant guides 188 to hold and position the optical conduits (discussed below). In this embodiment, the separable interface is between the first and second lens components and the optical conduit(s) is (are) secured to the second lens component such that the optical conduits can be separated from the interposer by removing the second lens component. Such an embodiment is advantageous because the interface is located at the expanded-beam coupling between the first optical path and the second optical path along an air gap 152, 252. The separable interface, and, particularly, the alignment means, is disclosed in detail below.

In an alternative embodiment, shown in FIG. 2, the separable interface 230 is between the second lens component 203 and an optical conduit component 285. Specifically, in this embodiment, the interposer comprises an optical conduit component 285 to which the optical conduits 205 are attached. Suitable optical conduit components include, for example, fiber pigtail connectors, fiber waveguide connectors and waveguide-to-fiber mode matching elements. Other embodiments will be known or obvious to one of skill in the art in light of this disclosure. In this embodiment, when the optical conduit component is separated from the interposer, the reflective surface 204 remains attached to the second lens component 203. Here, the optical conduit component is configured to align the optical conduits precisely with the reflective surface to thereby couple them with the second optical path.

In another alternative embodiment, the reflective surface is connected to the optical conduit component, such that, when the optical conduit component is separated from the interposer, the reflective surface is removed as well. In this embodiment, the optical conduit component and the second lens component should align such that the reflective surface is deposed on the top surface of the second lens component and aligned with the second optical path.

The optical conduit 105, 205 may be any known medium for transmitting light. Suitable optical conduits include, for example, optical fibers, waveguides, and planar waveguides. In the embodiment of FIGS. 1 and 2, the optical conduit 105, 205 is an optical fiber. The fiber may be any known optical fiber including, for example, single mode, a multimode, or a polarization-maintaining single mode fiber. Likewise, the fiber may be configured in any known way, including, for example, as a fiber stub, a discrete fiber, part of a fiber ribbon, a long fiber, or as part of a pigtail for splicing or connection to a longer length of fiber.

The optical conduit may be secured to the interposer and aligned with the second optical path in a variety of known ways. For example, if the optical conduit is an optical fiber, it may be secured to either the second lens component 103 (FIG. 1) or to an optical conduit component 285 (FIG. 2). The optical conduit may be secured using known techniques. For example, in the embodiments of FIGS. 1 and 2, compliant guides 188, 288 may be used as disclosed in U.S. patent application Ser. No. 13/871,571 and be formed on the second lens component using known deposition techniques. Suitable materials for deposition include, for example, photoresists such as SU-8. Other materials will be known to those of skill in the art in light of this disclosure. Alternatively, the second lens component may also comprise traditionally etched V- or U-grooves to hold the optical conduits or fibers in place. V-grooves are particularly well suited for seating cylindrical fiber by using the angled walls of the groove, although the invention is not limited to V-grooves. The grooves may be defined in different components of the interposer. For example, referring the embodiment of FIG. 1, grooves may be etched into the top surface 103b of the second lens component 103 to hold and align the optical conduits. In such an embodiment, it may be preferable also to define the reflective surface 104 in the top surface 103b. Alternatively, the grooves may be defined in the optical conduit component 285 of FIG. 2. In one embodiment, the grooves and the reflective surface may be defined in common photolithography step(s), using techniques disclosed, for example, in U.S. Pat. No. 8,818,145.

The separable interface 130, 230 functions to provide a disconnect feature between the optical conduit 105, 205 and the optical component 101, 201. As mentioned above, this disconnect feature is either along the second optical path or at the expanded-beam coupling. Thus, the separable interface 130 is located at a point in which the beam is expanded, and is less susceptible to misalignment and debris. In the embodiment of FIG. 1, the separable interface 130 is at the expanded-beam coupling between the first and second lens components. Such an embodiment may be preferred in certain applications because the separable interface 130 is at an air gap between the first and second lenses 150, 151.

Having the separable interface at an air gap avoids problems with trapping dirt and other debris between optical components which can degrade optical performance.

In the embodiment of FIG. 2, the separable interface 230 is along the second optical path 220, but between reflective surface 204 and the optical conduit. Such an embodiment may be preferred if a discrete optical conduit component, in the form of a pigtail connector, for example, is desired. Still other embodiments will be known or obvious to those of skill in the art in light of this disclosure.

Regardless of the location of the separable interface, the interposer should have alignment means to ensure the different components of the separable interface align to define the second optical path. Generally, although not necessarily, the alignment means facilitates passive alignment. Such passive alignment means may include, for example, fiducials, alignment pins/holes, one or more register surfaces, and mating contours. In one embodiment, the fiducials comprises two or more pairs of opposing V-grooves 180, 181 (FIG. 1), 280, 281 (FIG. 2), each opposing groove being on either side of the separable interface. At least two pairs of opposing V-grooves are non-parallel. An alignment sphere/ball 195, 295 is disposed in each pair of opposing grooves. Such a configuration thereby functions to align planar components on three axes, and is disclosed for example in U.S. Pat. No. 5,574,561.

In one embodiment, the interposer comprises a substrate 165, 265, which serves a number of purposes. For simplicity purposes, the functionality of the substrate is described in connection with the embodiment of FIG. 1, although such functionality applies as well to the other embodiments of this disclosure. The primary purpose of the substrate is to function as the backbone of the interposer 100 to support, secure, and align its various components such as e.g., the optical component 101, lens components 102 and 103, and supporting electrical circuitry 190 (which can include e.g. driver/receiver integrated circuits 191 and/or heat sink). Accordingly, the substrate should be a relatively well specified and reliable material that is thermally stable, and suitable for being heated to temperatures typical in solder reflow applications. In one embodiment, the substrate also functions as an insulator for electrical circuitry and thus should be a good dielectric. Suitable materials that are both well specified, reliable and relatively inexpensive include, for example, various types of glass, ceramics, quartz, polysilicon, amorphous silicon, and silicon. In one particular embodiment, the substrate 165, 265 is glass, which has the benefit of being particularly well specified, inexpensive, a good dielectric, and optically transparent for a wide range of optical signals. In another embodiment, the substrate 165, 265 is silicon which lends itself to wafer level mass production and precise wet etching techniques.

In one embodiment, the substrate comprises opposing first and second sides 165a, 265a and 165b, 265b. The first side of the substrate is adapted for receiving at least one electrical component 190 and the second side of the substrate adapted for supporting the optical component 101, 201. For example, in one embodiment, the electrical transmit/receive integrated circuits 191, which are electrically connected to the optical component, can be mounted either to the first side 165a, 265a of the substrate 165, 265 and interconnected by through vias 167, 267 to conductive pillars 166, 266 and solder balls that are electrically coupled to the optical component, or the circuits 191 can be mounted to the second side 165b, 265b of the substrate 165, 265 adjacent to the optical component and connected electrically to the optical component directly with just top side electrical traces.

Additionally, in one embodiment, the first side 265a of the substrate 265 may contain pads for facilitating electrical connections as is known in the art through interface with other common electrical components, such as a printed circuit board, microcontroller 293 (FIG. 2) or a flexible circuit 292 (FIG. 2). Still other configurations of the electrical interconnects will be obvious to one of skill in the art in light of this disclosure.

The interposer of the present invention also lends itself to economical and highly repeatable manufacturing. In one embodiment, a significant portion of the preparation of the assembly is performed at the wafer/panel stage. That is, rather than preparing each assembly as a discrete component, multiple assemblies can be prepared simultaneously on a wafer/panel. This is a known technique to facilitate large-scale manufacturability. Benefits of wafer/panel fabrication include the ability to define multiple features and components on multiple optical assemblies in one step. For example, most if not all of the critical alignment relationships may be defined on the wafer/panel scale, often in just a few, or even a single, photolithography step. Specifically, the location of the grooves, compliant guides for holding the fiber and fiber stubs and the contact pads/pillars for electrically connecting and providing passive alignment of the optical components may be defined in a single masking step. Additionally, in one embodiment, the optical/electrical interconnections among the various components may be defined in a single masking step. For example, the various traces interconnecting the pads/pillars for the optical component and the pads for the electrical driver circuitry, and the traces between the driver circuitry and the through-substrate vias may be defined in a single masking step. In one embodiment, even the edges of the optical component and substrate are defined in the same masking step. For example, each edge of the optical component is one half of a groove etched in the wafer/panel. The wafer/panel is simply parted at the bottom of each groove to form optical components with precisely controlled edges. This way, the distance from the edge of the optical component to critical features may be precisely controlled, often in a single step, thereby eliminating tolerance build up and simplifying assembly manufacturing with the optical component by use of these precisely controlled edges. These advantages are expected to increase as the size of wafer/panels and their handling capabilities increase as well. Further economies may be realized by etching these features using the same photolithographic procedure. Although a single etching procedure may be used, in certain circumstances, two or more etching procedures may be beneficial.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended claims not be limited to the particular embodiment disclosed herein.

What is claimed is:

1. An interposer for coupling an optical conduit to an optical component, said interposer comprising:
   an optical component comprising at least a photonic integrated circuit having an optical waveguide;
   a first lens component having a first lens overlaying said optical component, wherein said optical component and said first lens component are discrete components;
   a second lens component overlaying said first lens component and having a second lens, said first and second lenses being configured to define an expanded-beam coupling therebetween;
   wherein said first and second lenses are integral with said first and second lens components, respectively;
   wherein an air gap exists between said first and second lenses;
   wherein said first and second lenses are configured as collimating lenses;
   at least one reflective surface optically coupled with said second lens;
   a first optical path at least partially defined between said optical component and said first lens to accommodate a diverging light beam from said optical component to said first lens, said first optical path being essentially perpendicular to said optical waveguide;
   a second optical path at least partially defined between said second lens and said at least one reflective surface to accommodate a converging light beam from said second lens to said at least one reflective surface; and
   a separable interface between said first and second lens components at said expanded-beam coupling.

2. The interposer of claim 1, wherein said first and second optical paths are defined in components comprising a silicon-based material or glass-based material.

3. The interposer of claim 1, wherein said optical component and said first and second lens components comprise one or more silicon-based or glass-based materials.

4. The interposer of claim 1, wherein said separable interface comprises two opposing surfaces and fiducials on each opposing surface for facilitating passive alignment.

5. The interposer of claim 1, further comprising:
   at least one groove to receive said optical conduit, said optical conduit comprising an optical fiber, and aligned with said reflective surface such that said optical fiber is optically coupled with said second optical path when disposed in said at least one groove;
   wherein said reflective surface and said at least one groove are permanently attached to a top surface of said second lens component.

6. The interposer of claim 5, further comprising:
   said optical fiber disposed in said at least one groove optically coupled with said reflective surface.

7. The interposer of claim 1, further comprising:
   at least one groove to receive said optical conduit and aligned with said reflective surface such that said optical conduit is optically coupled with said second optical path when disposed in said at least one groove.

8. The interposer of claim 7, wherein said separable interface is along said second optical path between said reflective surface and said optical conduit.

9. The interposer of claim 8, further comprising:
   a connector for holding said optical conduit; and
   fiducials on said connector for facilitating passive alignment.

10. The interposer of claim 1, wherein said optical component comprises a grating optically coupled to said waveguide to transition light between said first optical path and said waveguide.

11. The interposer of claim 10, wherein said grating comprises a Si3N4 grating.

12. The interposer of claim 1, further comprising:
    a substrate interfaced with said optical component, said substrate and said first lens component being on opposite sides of said optical component.

13. The interposer of claim 12, wherein said substrate comprises opposing first and second sides, said first side for receiving at least one electrical component and said second side for supporting said optical component.

14. The interposer of claim 13, wherein said optical component is not an electrical component and further comprising said at least one electrical component.

15. The interposer of claim 1, wherein said optical component is not an electrical component.

16. The interposer of claim 1, wherein said separable interface comprises two or more pairs of opposing V-grooves, each opposing groove being on either side of the separable interface, at least two pairs of said two or more pairs of opposing V-grooves are non-parallel, and an alignment sphere disposed between each pair of opposing grooves.

* * * * *